US009390573B2

(12) United States Patent
Marshall Chesney et al.

(10) Patent No.: US 9,390,573 B2
(45) Date of Patent: Jul. 12, 2016

(54) ACCESS CONTROL READER ENABLING REMOTE APPLICATIONS

(71) Applicant: Sensormatic Electronics, LLC, Boca Raton, FL (US)

(72) Inventors: Margaret Marshall Chesney, Belfast (GB); Francis Donnelly, Belfast (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 14/515,907

(22) Filed: Oct. 16, 2014

(65) Prior Publication Data

US 2015/0034718 A1 Feb. 5, 2015

Related U.S. Application Data

(63) Continuation of application No. 13/622,182, filed on Sep. 18, 2012, now Pat. No. 8,888,002.

(51) Int. Cl.
*G06F 17/00* (2006.01)
*G06K 5/00* (2006.01)
*G07C 9/00* (2006.01)

(52) U.S. Cl.
CPC ........ *G07C 9/00904* (2013.01); *G07C 9/00039* (2013.01); *G07C 9/00103* (2013.01)

(58) Field of Classification Search
USPC ....................................... 235/382, 375, 382.5
See application file for complete search history.

(56) References Cited

U.S. PATENT DOCUMENTS

| | | | | |
|---|---|---|---|---|
| 5,245,329 | A | 9/1993 | Gokcebay | |
| 5,608,387 | A | 3/1997 | Davies | |
| 6,351,817 | B1 | 2/2002 | Flyntz | |
| 7,136,711 | B1 | 11/2006 | Duncan et al. | |
| 7,733,231 | B2 | 6/2010 | Carney et al. | |
| 8,207,816 | B2 | 6/2012 | Crigger et al. | |
| 9,332,060 | B2 * | 5/2016 | Arvidsson | H04L 67/10 |
| 2003/0028814 | A1 * | 2/2003 | Carta | G07C 9/00039 726/21 |
| 2004/0095276 | A1 | 5/2004 | Krumm et al. | |
| 2004/0200563 | A1 | 10/2004 | Murray | |
| 2004/0249662 | A1 * | 12/2004 | Mallick | G06Q 10/0637 705/7.36 |
| 2005/0234874 | A1 * | 10/2005 | Berlin et al. | 707/3 |

(Continued)

FOREIGN PATENT DOCUMENTS

| | | | |
|---|---|---|---|
| CN | 102176718 | A | 9/2011 |
| GB | 2464517 | A | 4/2010 |
| JP | 2007197911 | A | 8/2007 |

OTHER PUBLICATIONS

International Search Report and Written Opinion of the International Searching Authority, mailed Nov. 29, 2013, from International Application No. PCT/US2013/058928, filed Sep. 10, 2013.

(Continued)

*Primary Examiner* — Tuyen K Vo
(74) *Attorney, Agent, or Firm* — HoustonHogle, LLP

(57) ABSTRACT

A system and method for enabling users to run remote applications on access control readers located throughout office buildings. A system administrator creates different remote applications groups such as admin, engineer or cardholder and then assigns users to one of the remote application groups. Users are then able to run the remote applications assigned to their remote application group from any of the access control readers located throughout the office building.

21 Claims, 17 Drawing Sheets

(56) References Cited

U.S. PATENT DOCUMENTS

| | | | | |
|---|---|---|---|---|
| 2006/0143471 | A1 | 6/2006 | Igarashi | |
| 2008/0006685 | A1 | 1/2008 | Rackley, III et al. | |
| 2008/0051079 | A1 | 2/2008 | Forsgren | |
| 2008/0252414 | A1 | 10/2008 | Crigger et al. | |
| 2009/0094557 | A1 | 4/2009 | Howard | |
| 2009/0097720 | A1 | 4/2009 | Roy et al. | |
| 2009/0102679 | A1* | 4/2009 | Schoettle | G08B 7/064 340/815.4 |
| 2009/0153290 | A1 | 6/2009 | Bierach | |
| 2009/0321517 | A1 | 12/2009 | Deane et al. | |
| 2010/0066486 | A1 | 3/2010 | Park et al. | |
| 2010/0332648 | A1 | 12/2010 | Bohus et al. | |
| 2011/0038278 | A1 | 2/2011 | Bhandari et al. | |
| 2011/0238579 | A1* | 9/2011 | Coppinger | G06Q 20/20 705/67 |
| 2011/0239132 | A1 | 9/2011 | Jorasch et al. | |
| 2013/0194064 | A1 | 8/2013 | McGeachie | |
| 2013/0339749 | A1 | 12/2013 | Spuehier et al. | |
| 2015/0067595 | A1* | 3/2015 | Hilbrink | G06F 3/0484 715/808 |

OTHER PUBLICATIONS

Written Opinion of the International Preliminary Examining Authority, mailed Sep. 11, 2014, from International Application No. PCT/US2013/058928, filed Sep. 10, 2013.

International Preliminary Report on Patentability, mailed Jan. 22, 2015, from International Application No. PCT/US2013/058928, filed Sep. 10, 2013.

* cited by examiner

ACCESS CONTROL READER ENABLING REMOTE APPLICATIONS

RELATED APPLICATIONS

This application is a Continuation of U.S. application Ser. No. 13/622,182, filed on Sep. 18, 2012, which is incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Security systems are often implemented in schools, office buildings, and government building, to list a few examples. These security systems typically include elements such as surveillance cameras, network video recorders (NVRs) that store video from the cameras, door controllers, and access control readers to provide access to restricted areas.

Generally, access control readers are used to validate users' identities and enable authorized users to access restricted areas through locked doors, for example. Typically, the access control readers are connected via a communications network to the security system's control system. When users attempt to access the restricted areas, the access control readers obtain information about the users from databases of user information. If the users are authorized to enter the restricted area, then the access control or a separate door controller unlocks the locked door for the users, in one specific example.

Recently, one trend in security systems is to deploy access control readers throughout office buildings. For example, engineers may be able to access an engineering area of the building, but they are not able to access an accounting area of the building.

Additionally, access control readers historically only included card readers. Yet, it is becoming increasingly common to add components to the access control readers such as displays, video cameras, and microphones, to list a few examples.

SUMMARY OF THE INVENTION

One problem with security systems was that the elements of the security systems needed to be configured after installation and possibly reconfigured over their operational lifetimes. Traditionally, the configuration of the elements was performed by an administrator on a security system workstation. Additionally, the security system workstation was often located in another, remote part of the office building or in a different building.

Another problem was that information about the security systems could only be accessed from workstations. For example, reports concerning whether an alarm was triggered (and when) or if any users had recently interacted with an access control reader could only be generated by an administrator at the workstation. Additionally, if (non-administrator) users wanted to change information associated their keycards, the users had to ask the administrator to change the information.

The solution here is to enable the users to run remote applications on the access control readers. In one specific implementation, a system administrator, for example, creates different remote applications groups such as admin, engineer or cardholder, to list a few examples. Then, the users are assigned to one of the remote application groups. Next, the system administrator assigns remote applications, which are executed on application servers, to the remote applications groups. Generally, the remote application groups with higher access levels (e.g., admin) are assigned more remote applications than other remote application groups. Conversely, remote application groups with lower access levels (e.g., cardholders) are assigned fewer remote applications (or possibly none at all). Additionally, the system administrator is able to create as many different groups as needed with any combination of remote applications assigned to the different remote application groups.

In general, according to one aspect, the invention features a security system operation method. The method includes that upon user activation of access control readers of the security system, determining whether an application mode of the access control readers is invoked. The method further including displaying selectable applications on displays of the access control readers and invoking the applications in response to selection by the users.

In embodiments, displaying selectable applications comprises determining assigned groups of the users and acquiring a list of selectable applications from an application server based on the assigned groups of the users. Preferably, the applications are executed on an application server. The output from the executing applications is sent for display on the access control readers, using PHP web pages, for example.

The application mode should only be only enabled for validated users. In one example, invoking applications includes: invoking daily swipes applications and displaying on the displays of the access control readers numbers of swipes by the users over previous days. In another example, invoking applications includes invoking change PIN applications and displaying on the displays of the access control readers current PIN screens, new PIN screens, and PIN confirmation screens. In still further cases, numbers of occupants within one or more zones and a remaining allowance of people allowed in the one or more zones, and access control readers device settings that users are able to configure are displayed.

In general, according to another aspect, the invention features an access control reader. The reader includes a user validation system for validating users and a display that displays a user interface that includes selectable applications that are invoked by the users.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
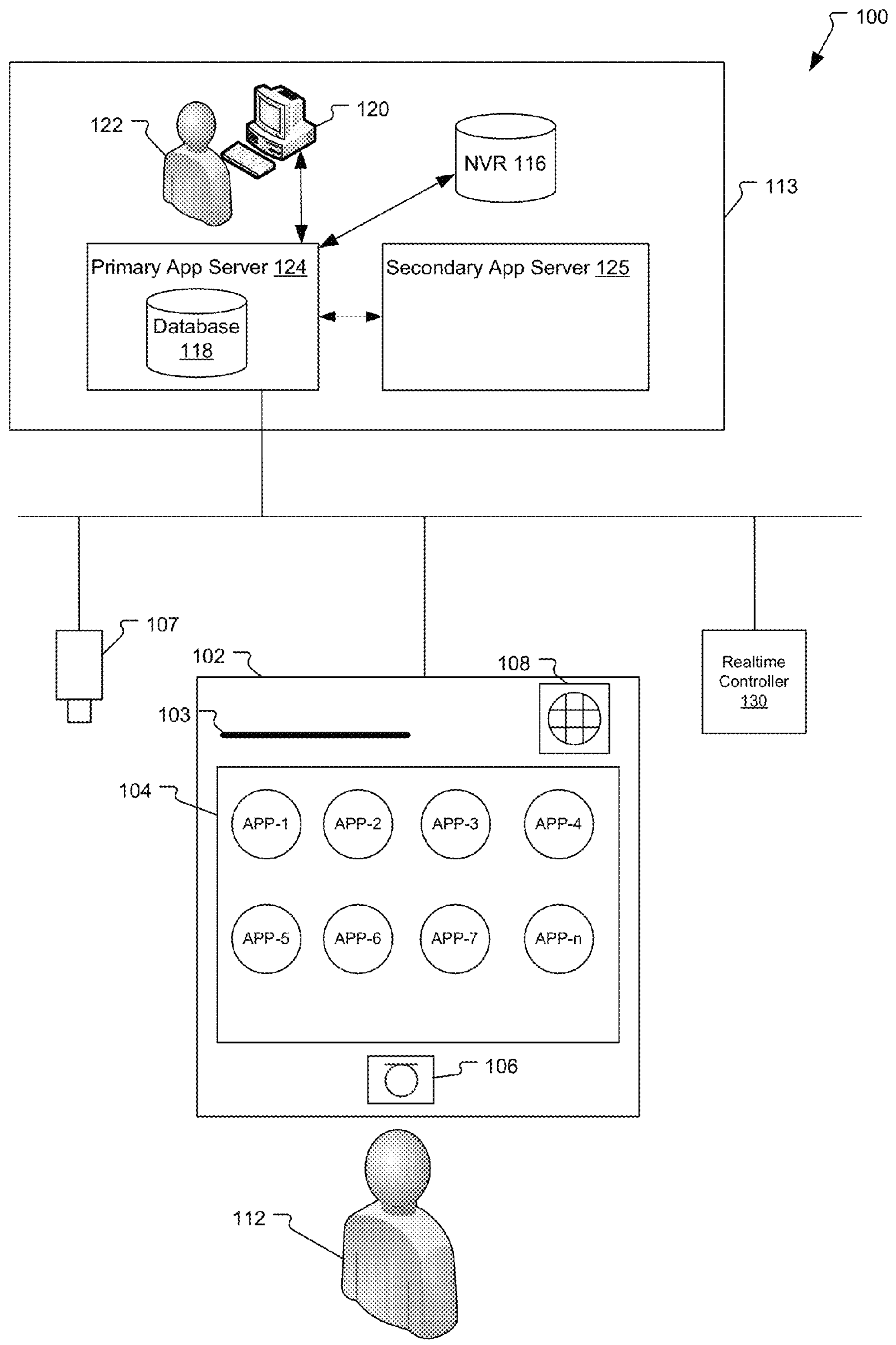
FIG. 1 is block diagram of a security system including an access control reader that enables a user to run remote applications according to the invention.

FIG. 1 is block diagram of a security system 100 including an access control reader 102 that enables a user 112 to run remote applications according to the present invention.

In the illustrated embodiment, the access control reader (or reader) 102 of the security system 100 includes a display 104, a card reader (or user validation system) 103, a speaker 108, and a microphone 106.

In the illustrated example, the display 104 is a touchscreen that displays user selectable icons, which link to corresponding remote applications. In a typical implementation, the remote applications are executed on a primary application server 124, which is also known as a central database computer.

The user validation system validates users. In the illustrated example, the user validation system is the card reader 103 of the access control reader 102, which reads identification badges or keycards of the user 112. In a typical implementation, the card reader 103 reads contactless smart cards.

Contactless smart cards operate similar to RFID technology, but typically provide additional security features such as encryption for protecting information of the users. Additionally, contactless smart cards often have a range of less than 10-15 centimeters (approximately 4-6 inches), which prevents other nearby readers from accidentally reading the smart card.

In an alternative embodiment, the card read uses radio frequency identification (RFID) technology to read an RFID tag embedded within a keycard (or identification badge). The contactless smart card or RFID tag is linked to information about the users stored in a database 118 and at a realtime controller 130, which is connected via a communication network 117. Other validation systems include voice or facial recognition systems, fingerprint readers, and/or retinal scanners, to list a few examples.

Together, the speaker 108 and microphone 106 create an intercom system. In operation, the user 112 sometimes needs to communicate with security personnel as part of a validation or identification process. The speaker 108 and microphone 106 enable communication between the user and the security personnel. In a typical implementation, the access control reader 102 uses VoIP (Voice over Internet Protocol) technology to transmit the communications between the user 112 and the security personal.

In a typical implementation, the realtime controller 130 performs the validation of the users 112 by comparing the information read from the user's keycard with the user information stored at the realtime controller 130 and/or database 118. Then, if the user is validated, the realtime controller 130 instructs the access control reader 102 to unlock the locked door for the user. After the predefined length of time expires, the access control reader 102 automatically relocks the doors to prevent unauthorized persons from entering the restricted area. Additionally, the realtime controller 130 often provides additional security such as anti-passback security, which prevents a keycard from form being used to enter a zone multiple times before leaving the zone first. In a current embodiment, each realtime controller 130 is able to control up to 256 access control readers 102. Moreover, up to 256 controllers 130 are able to be deployed in the security system 100.

In an alternative embodiment, the functionality of the realtime controller 130 is implemented on the primary application server 124. In this configuration, the primary application server 124 performs the validation of the users and then instructs the access control reader 102 to unlock the locked door for validated users.

If the realtime controller 130 is offline, the access control reader 102 is still able to operate as a traditional access control reader. Typically, each access control reader 102 includes an internal database of authenticated users that is accessed by the access control reader 102 if the realtime controller 130 is offline.

The security system 100 typically includes additional elements such as external cameras 107, smoke detectors, fire alarms, or motion sensors, to list a few examples. In a typical implementation, the elements of the security system 100 are connected via the communications network 117 or bus, which is generally a private or public data network, or a combination of both.

In the illustrated example, the security system 100 further includes an office or room 113, which houses the primary application server 124, the database 118, a secondary application server 125, a network video recorder (NVR) 116, and a workstation 120.

The primary application server 124 stores and runs the remote applications and includes the database 118. Additionally, the primary application server 124 also stores additional software and information such as the software to run the server and web pages, for example. Generally, the primary application server 124 is also connected to a secondary application server 125 and NVR 116. The secondary application server 125 is a backup (or fail-over server) and is only utilized when the primary application server 125 fails. The application servers 124, 125 are typically Linux web servers running Apache web server software by The Apache Software Foundation.

The NVR 116 stores video data external cameras 107 that are part of the security system 100. Typically, time and date information are added to the captured audio and video to allow the data to be indexed and reviewed at a later date.

The database 118 stores information about users such as a name, date of birth, occupation, department, company, identification card or keycard number, and an image of the user, to list a few examples. Generally, some of the user information stored in the database 118 is also stored at the realtime controller 130 to validate card swipes.

In a typical implementation, the workstation 120 is used by an administrator 122 to edit user information. Additionally, the workstation 120 allows the administrator 122 to monitor the application servers 124, 125, review the audio and video data stored in the NVR 116, and otherwise set and change the configuration information of the security system.

Figure 2:
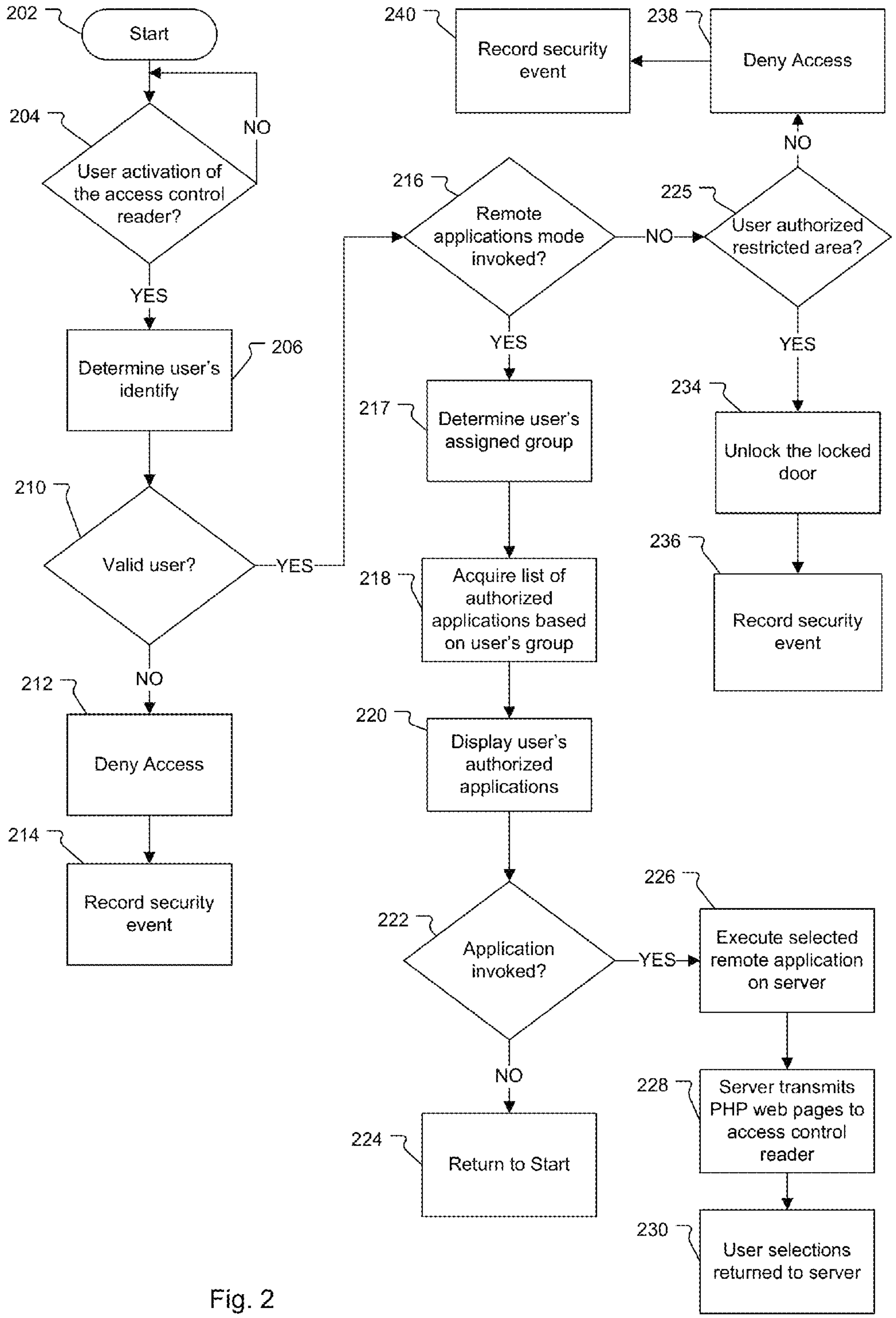
FIG. 2 is a flow diagram illustrating the operation of the security system that includes the access control that runs the remote applications according to the present invention.

FIG. 2 is a flow diagram illustrating the operation of the security system 100 that includes access control reader 102 that enables the user to run remote applications according to the present invention.

In the first step 204, the access control reader 102 waits for user activation of the reader 102. If the user 112 has not activated the access control reader 102, then the reader 102 waits for user activation. If the user 112 activates the access control reader 102, then access control reader 102 determines the user's identity in step 206. Typically, the user's identify is determined by reading information associated with the user's keycard and comparing it to information stored in the database 118. In an alternative embodiment, the access control reader 102 uses biometrics (or biometric information) such as facial recognition, retinal scans, and/or fingerprint information to identify the user 112.

In the next step 210, the access control reader 102 determines if the user 112 is a valid user. If the user 112 is not a valid user, then the access control reader 102 denies access to the restricted area in step 212 and records a security event in step 214.

If the user 112 is a valid user, then the access control reader 102 determines if a remote applications mode is invoked in step 216. If the remote applications mode is invoked, then the access control reader 102 determines the remote application group assigned to the user 112 in step 217. In the next step 218, the access control reader 102 acquires a list of authorized remote applications based on the assigned remote application group of the user 112. Next, the access control reader 102 displays the user's authorized remote applications on the display 104 of the access control reader 102 in step 220.

In the next step 222, the access control reader 102 determines if one of the remote applications is invoked by the user 112. If none of the remote applications is invoked, then the access control reader 102 returns to start (202) in step 224.

If the remote application is invoked, then the access control reader 102 executes the remote application on the application server 124 in step 226. In the next step 228, the application server 124 transmits PHP web pages to be displayed on the display of the access control reader 102. In the next step 230, the user selections made by interacting with the remote application are returned to the application server 124.

If the remote applications mode is not invoked in step 216, then the access control reader 102 determines if the user is authorized to access the restricted area in step 225. If the user 112 is not authorized to access the restricted area, then the access control reader 102 denies access in step 238 and records a security event in step 240.

If the user 112 is authorized to access the restricted area in step 225, then the access control reader 102 unlocks the locked door in step 234. In the next step 236, the access control reader 102 records the security event.

Figure 3:
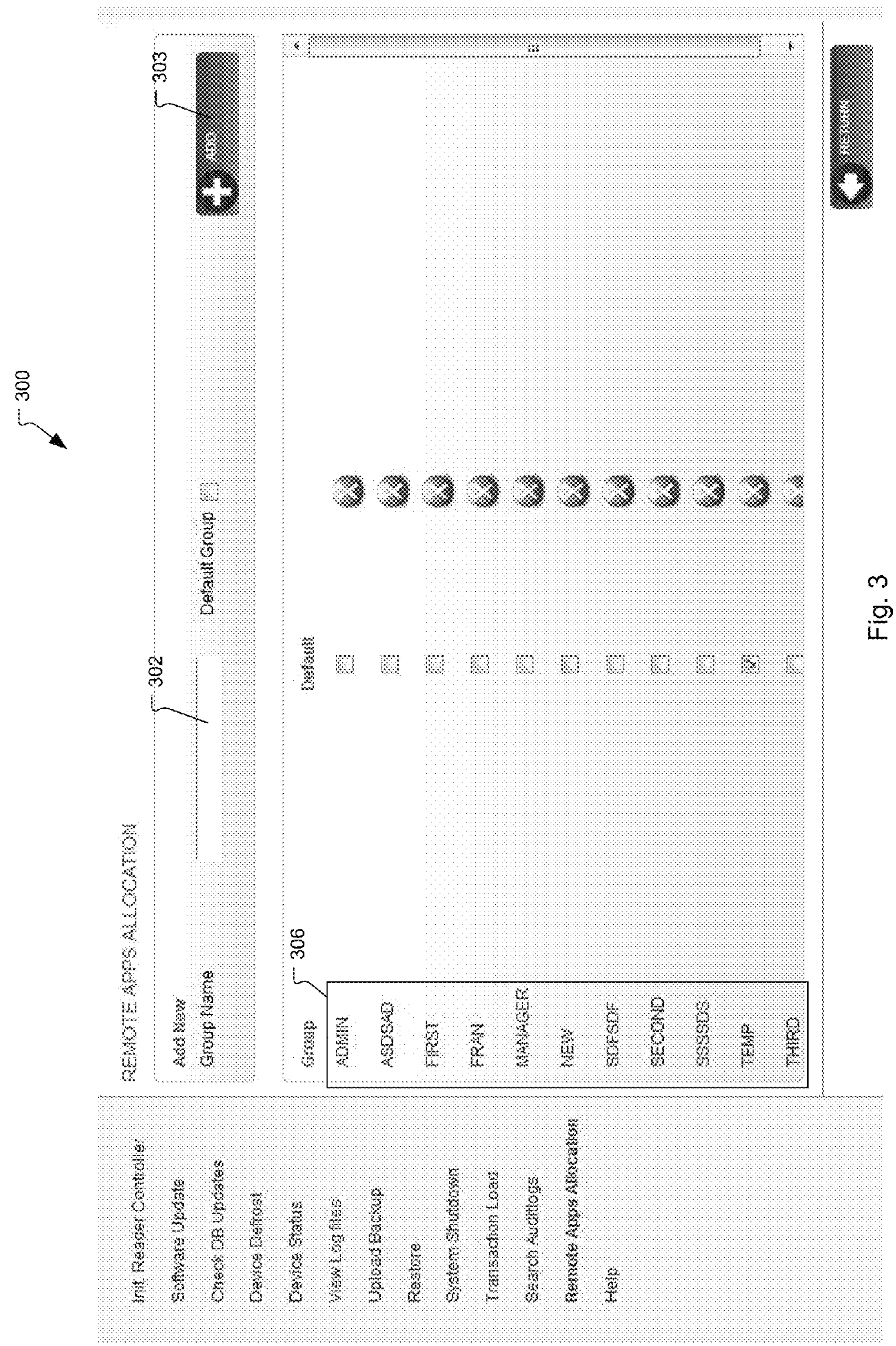
FIG. 3 shows the remote applications group editing screen for adding and removing remote application groups that is typically displayed on a workstation of the security system.

FIG. 3 shows the remote applications group editing screen 300 for adding and removing remote application groups.

In a typical implementation, the system administrator (e.g., ref numeral 122 in FIG. 1) creates new remote application groups as part of the configuration process of the security system by entering the name of the group in the group name box 302 and then selecting the Add button 303.

The remote applications group editing screen 300 displays a list 306 of all the current remote application groups. The system administrator 122 is able to select one of the remote application groups to be the default group by selecting a corresponding default box. The default group is the remote application group that is automatically assigned when new users are added to the database 118. Additionally, the remote application groups can be removed by selecting a corresponding remove button.

Figure 4:
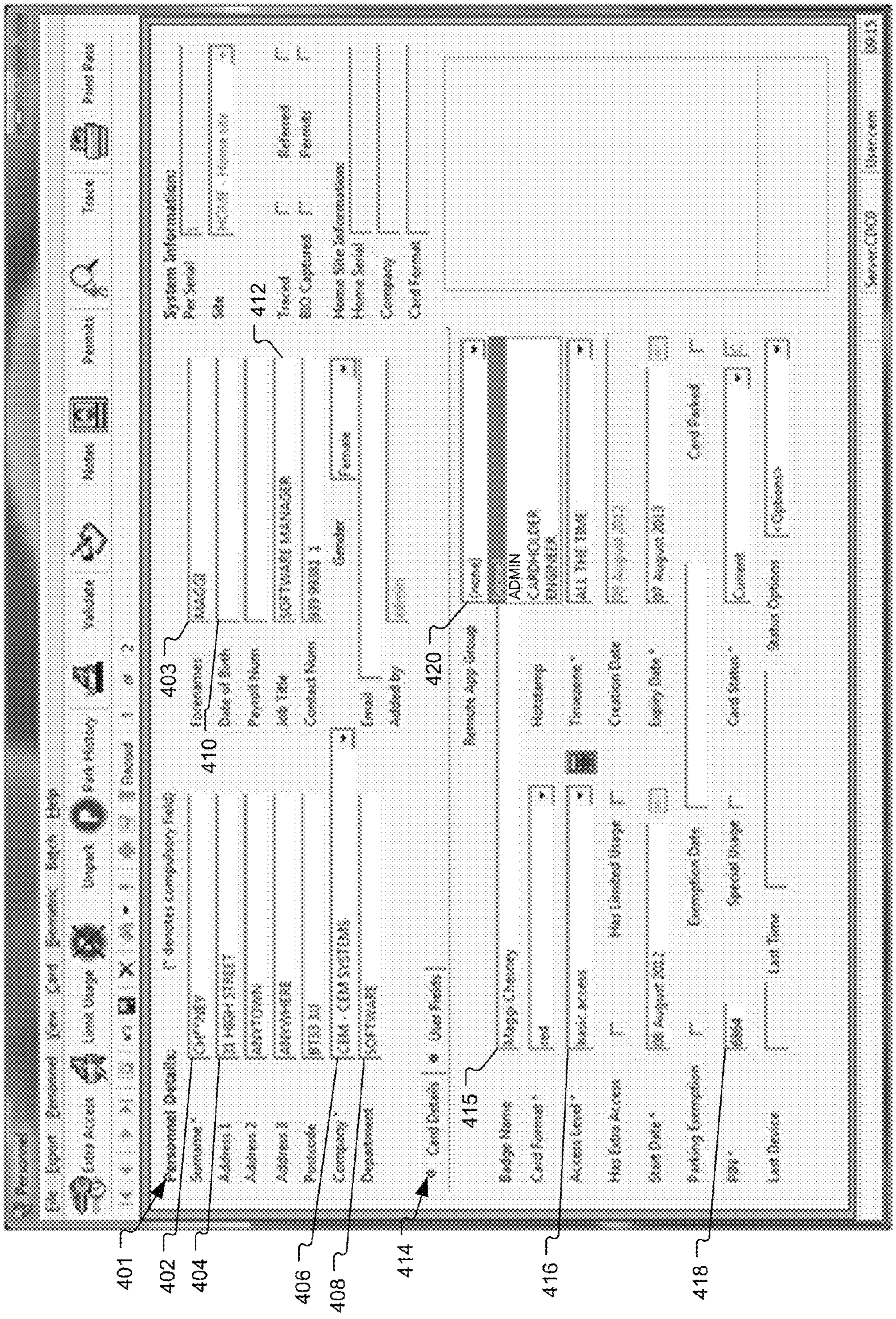
FIG. 4 shows a graphical user interface that is typically displayed on the workstation of the security system, the user interface is generated by an administration program for editing user information that is stored in a database and associated with the user keycards.

FIG. 4 shows a graphical user interface of a software program for editing user information that is stored in the database 118 and associated with the user keycards.

In the illustrated example, the graphical user interface is divided in a personnel details section 401 and a card details section 414. The personnel details section 401 includes fields to enter user information such as surname (or last name) 402, forename (or first name) 403, address 404, date of birth 410, company name 406, department name 408, and job title 412, to list a few examples. Additionally, the personnel details section 401 includes fields for other information such as payroll number, contact phone number, email address, and gender.

The card details section 414 enables the system administrator 122 to add, edit, or remove information associated the keycard of the user. For example, the system administrator is able to assign the badge name 415, an access level 416, a PIN 418, and the remote application group 420, to list a few examples.

Figure 5A:
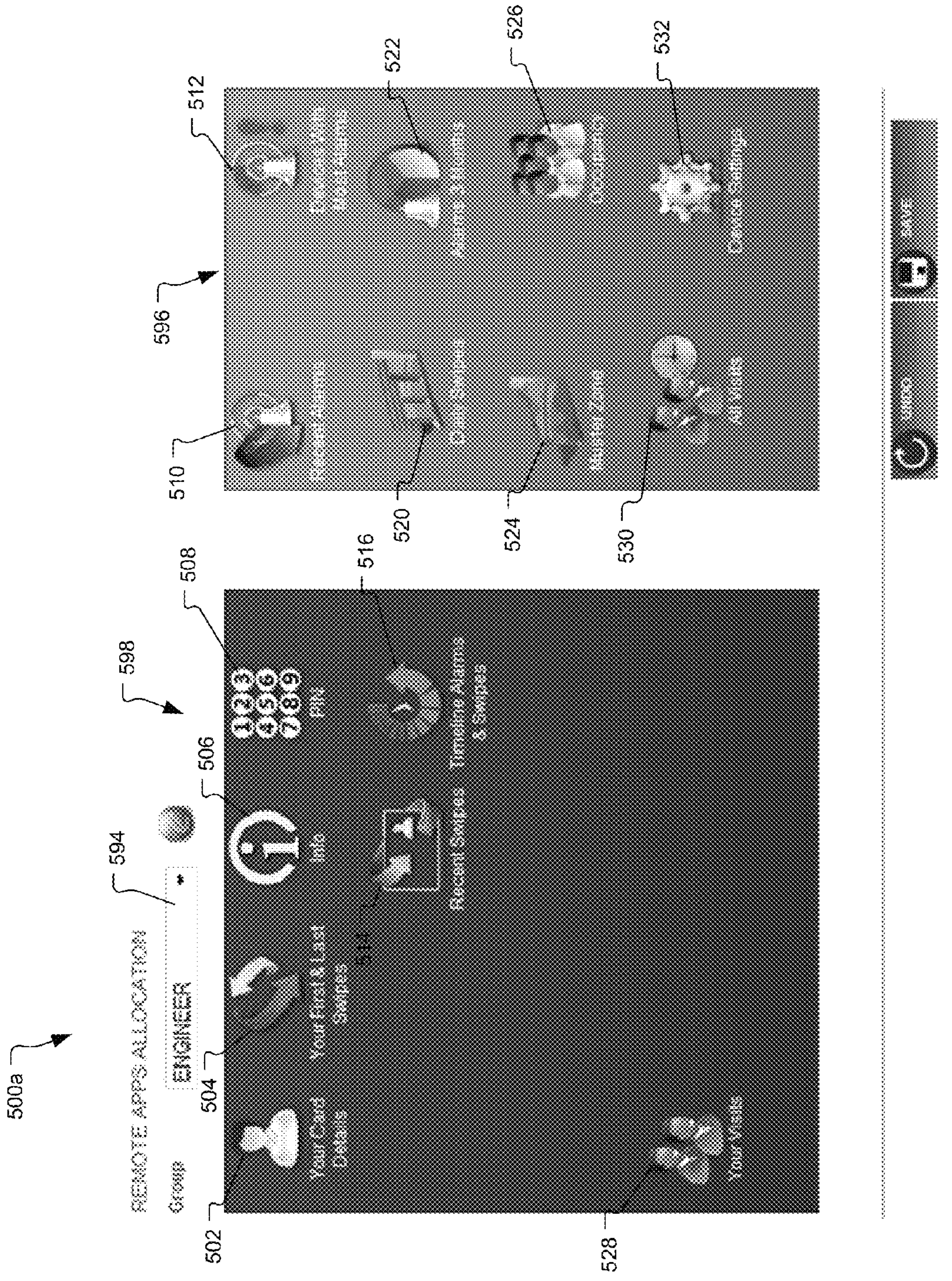
FIG. 5A shows the remote application allocation screen that is typically displayed on the workstation of the security system for editing which remote applications are assigned to the engineer remote application group.

FIG. 5A shows the remote application allocation screen 500*a* for editing which remote applications are assigned to the engineer remote application group.

In the illustrated example, the system administrator (ref numeral 122 in FIG. 1) selected engineer from the remote application group drop down menu 594. Additionally, the left window 598 displays icons of applications that can be assigned to the selected remote application group. The right window 596 displays a preview of what will be displayed in the display 104 of the access control reader 102.

In the illustrated example, the graphical user interface uses a drag and drop interface. Thus icons are dragged from the left window 598 and dropped the right window 596 to assign remote applications to the remote application group.

Generally, the remote application groups with higher access levels (e.g., admin or engineer) are assigned more remote applications than other remote application groups. Conversely, remote application groups with lower access levels (e.g., cardholder) are assigned fewer remote applications or possibly none at all.

Figure 5B:
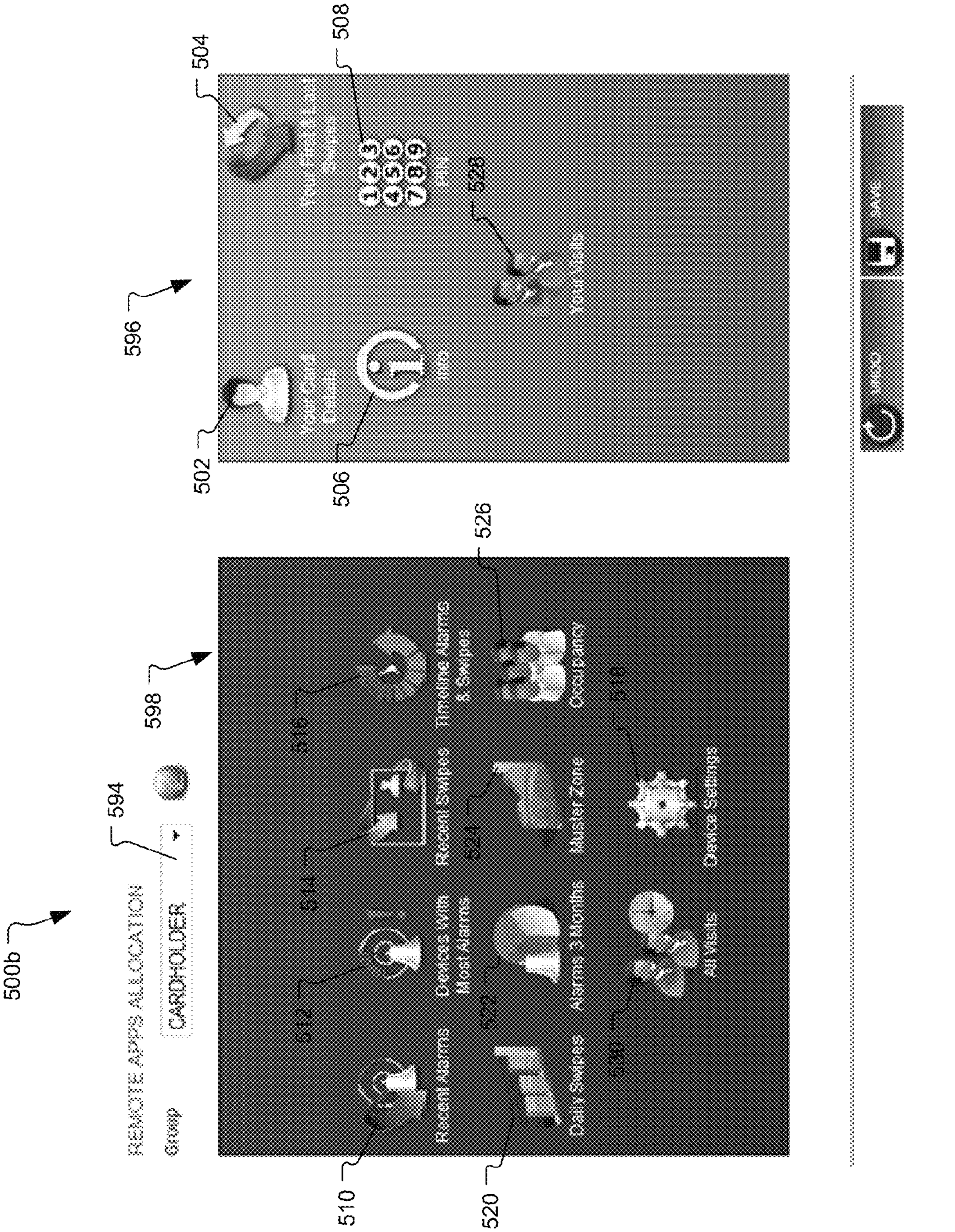
FIG. 5B shows the remote application allocation screen that is typically displayed on the workstation of the security system for editing which remote applications are assigned to the cardholder remote application group.

FIG. 5B shows the remote application allocation screen 500*b* for editing which remote applications are assigned to the cardholder remote application group.

In the illustrated example, the cardholder remote application group has the lower access level than the engineer remote application group. Thus, this remote application group is assigned fewer applications than the engineer remote application group.

Figure 5C:
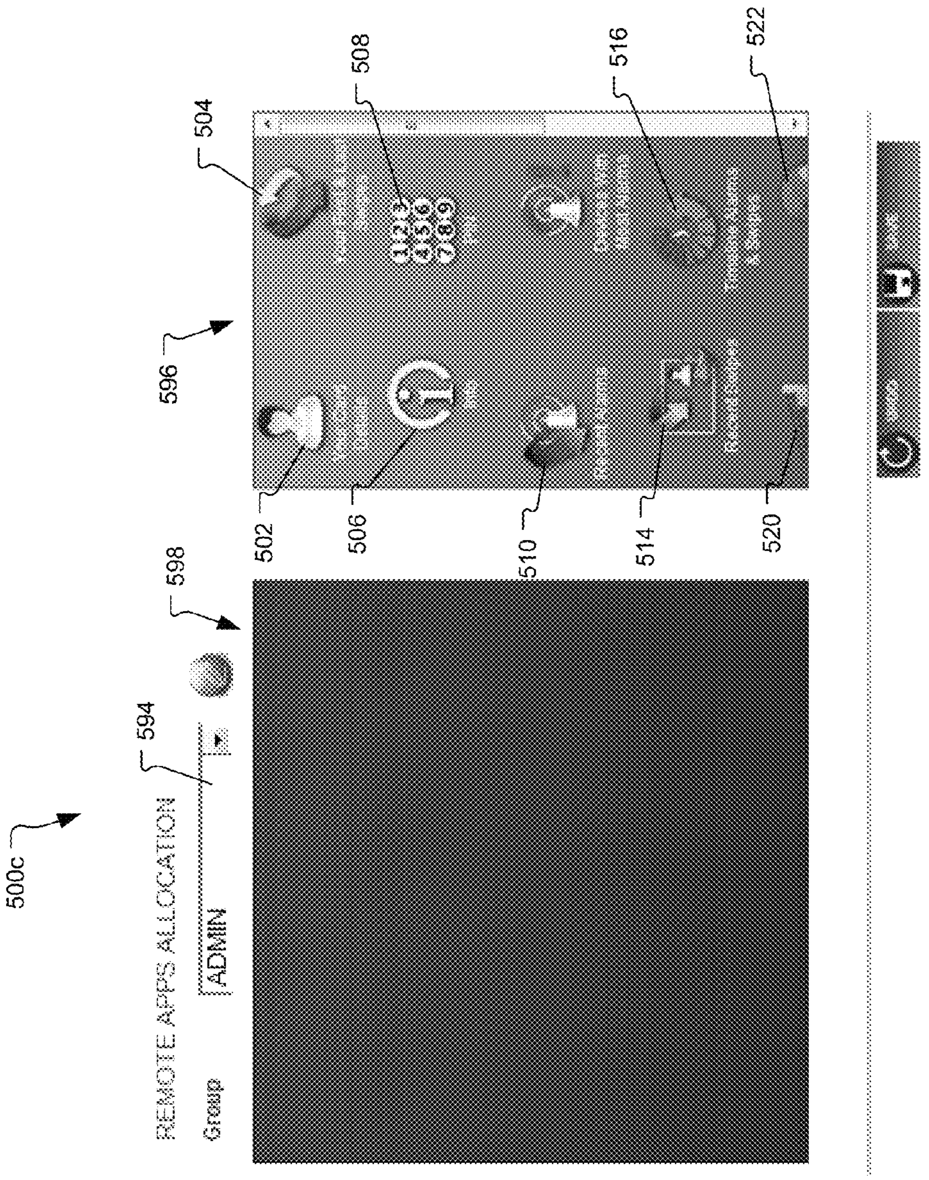
FIG. 5C shows an example of the remote application allocation screen that is typically displayed on the workstation of the security system for editing which remote applications are assigned to the admin remote application group.

FIG. 5C shows an example of the remote application allocation screen 500*c* for editing which remote applications are assigned to the admin remote application group.

In the illustrated example, the admin remote application group has the highest access level. Thus, the admin remote application group is assigned all of the remote applications.

Figure 6B:
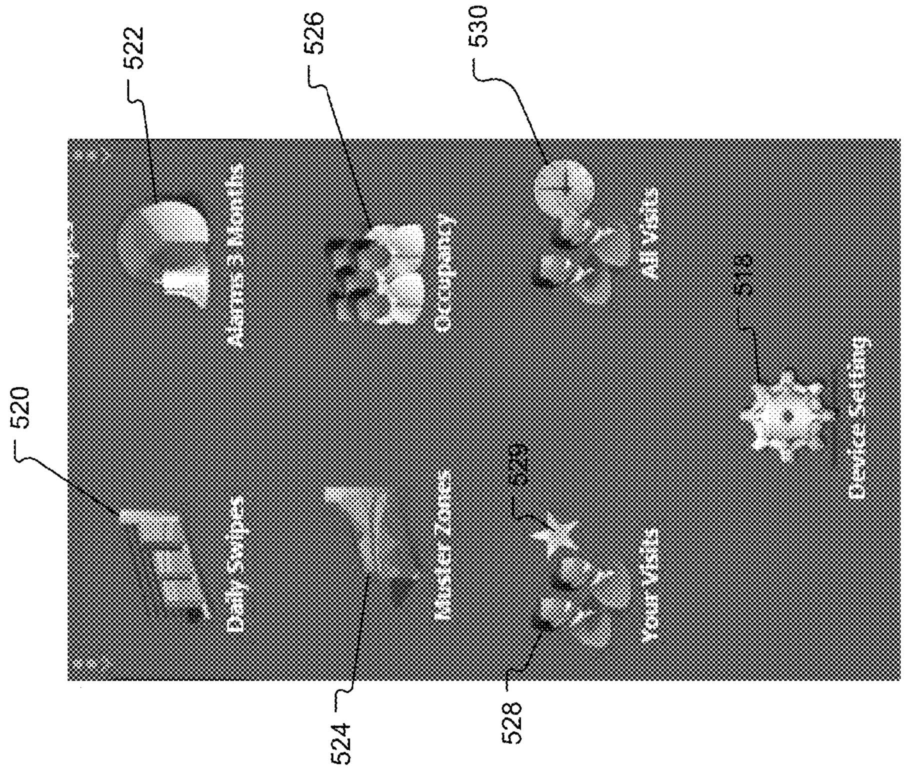
FIGS. 6A and 6B show how remote applications are displayed in the remote applications mode on the display of an access control reader.
Figure 6A:
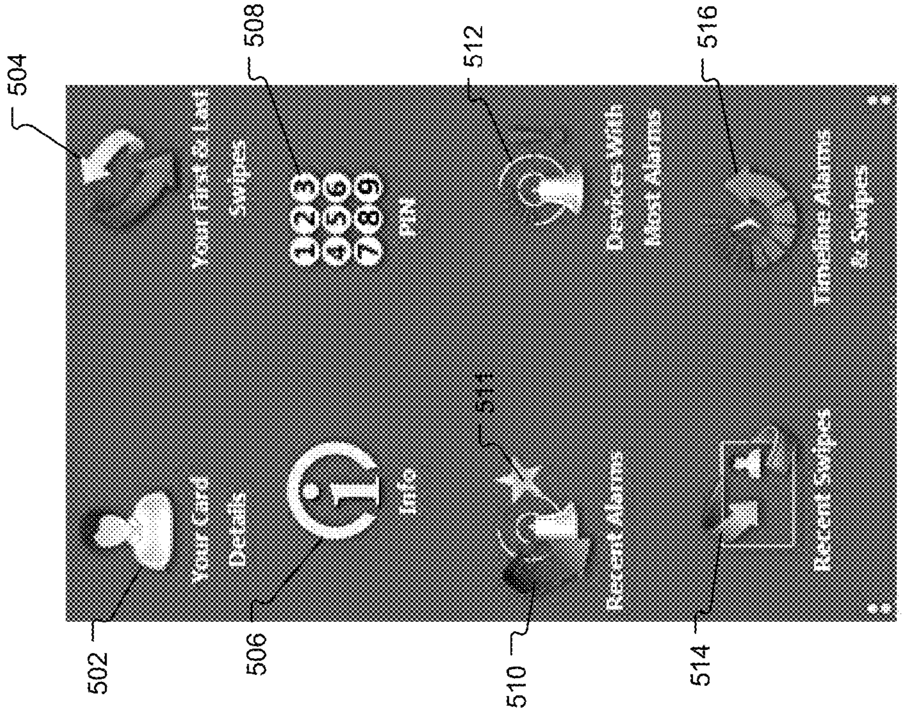

FIGS. 6A and 6B show how remote applications are displayed on the access control reader 102 when the applications mode is invoked. In the illustrated example, the icons do fit on the screen and are shown as FIGS. 6A and 6B between which a use can toggle using a scrolling function.

To invoke the remote applications mode, the user then presses a remote application button displayed on the display 104 prior to swiping their keycard. However, if the user does not wish to invoke the remote applications mode, then the user simply swipes their keycard and the access control reader 102 operates as a traditional access control reader to authenticate the user and provide access to the restricted area associated with the access control reader.

In a typical implementation, the icons 502 to 530 provide links to invoke corresponding remote applications that are executed on the primary applications server 124. In the illustrated embodiment, which utilizes a touchscreen display 104, the user invokes the desired remote application by touching the icon on the display 104.

Additionally, in the illustrated embodiment, stars 511, 529 are added to some icons to indicate a recent change or important update to that remote application. For example, the recent alarms star 511 indicates a recent alarm within the last 24 hours.

Figure 7:
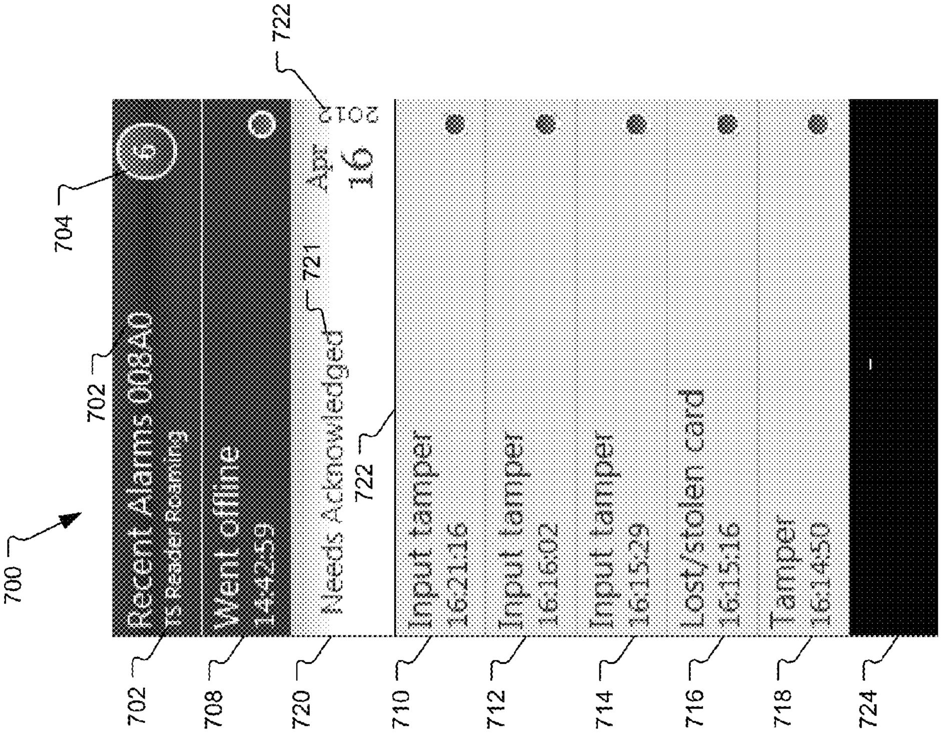
FIG. 7 shows the recent alarms screen of the recent alarms application, which is invoked by the recent alarms icon.

FIG. 7 shows the recent alarms screen 700 of the recent alarms application, which is invoked by the recent alarms icon 510 (shown in FIGS. 5A-5C and 6A-6B).

In a typical implementation, the recent alarms screen 700 displays up to twenty of the most recent alarms from the last 24 hours. The top of the recent alarms screen 700 includes a description of the device 702, an address of the access control reader 703, and a total number of alarms triggered in the last 24 hours 704. Generally, if an address is too long to fit at the top of the screen, then the address is abbreviated or replaced with ellipses.

In the illustrated example, each alarm is displayed as a separate row 708-718. Additionally, information such as the type of alarm, the time alarm was triggered, and the state of the alarm is also displayed within each row.

Generally, each row is expandable to show an expanded row 720 with additional information about the alarm such a description of the alarm's state 721 and the date the alarm was activated 722, to list a few examples. In the illustrated example, the most recent alarm is automatically expanded when the application is invoked by the user. In the current embodiment, separate days are distinguished by a border (e.g., ref numeral 722) at the top of the row. If there are less than twenty recent alarms, then the recent alarms screen 700 displays a black row (with a '–') 724 to indicate there are no more recent alarms to view.

In a typical implementation, if there are any recent alarms within the last 24 hours, then a star (ref. numeral 511 in FIG. 6A) is added to the recent alarms computer icon (e.g., ref. numeral 510 in FIG. 6A).

Figure 8:
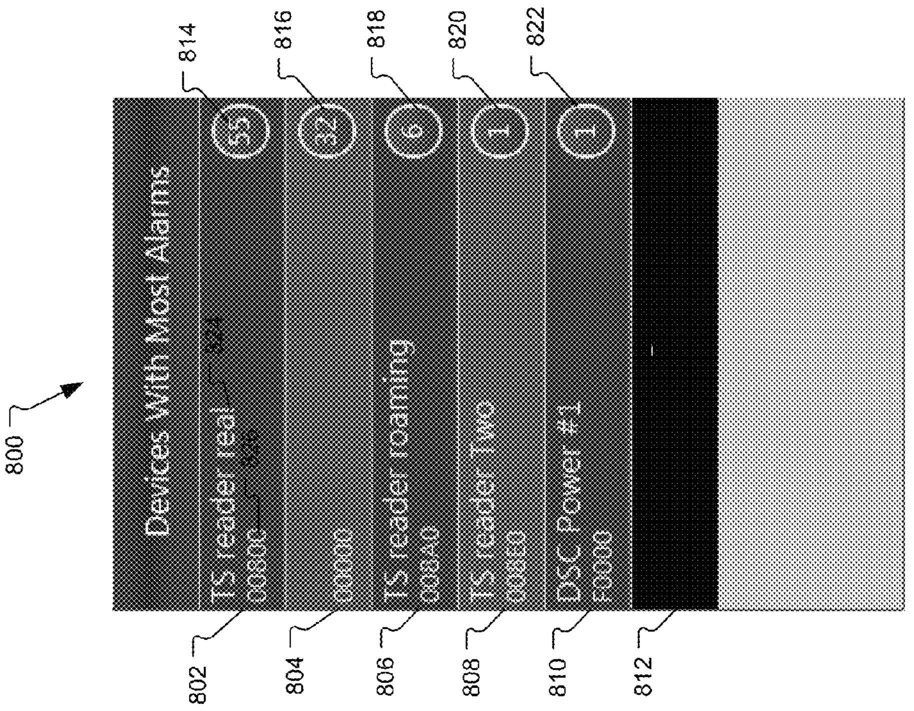
FIG. 8 shows the devices with most alarms screen of the devices with most alarms application, which is invoked by the devices with the most alarms icon.

FIG. 8 shows the devices with most alarms screen 800 of the devices with most alarms application, which is invoked by the devices with the most alarms icon 512 (shown in FIGS. 5A-5C and 6A-6B).

In a typical implementation, the devices with most alarms screen 800 displays up to twenty access control readers that have had alarms triggered within the last 24 hours. Each access control reader is displayed in a separate row 802 to 810. In the illustrated example, the list is sorted as based on the number of triggered alarms 814 to 822 at each access control reader.

In a typical implementation, each row includes a description 824 and address 826 of the access control reader. In a typical implementation, selecting one of the rows sends the user to the recent alarms screen (e.g., ref numeral 700 of see FIG. 7) of the selected access control reader.

If there are less than twenty access control readers with triggered alarms, then the devices with most alarms screen 800 displays a black row 812 to indicate there are no more access control readers to view.

Figure 9A:
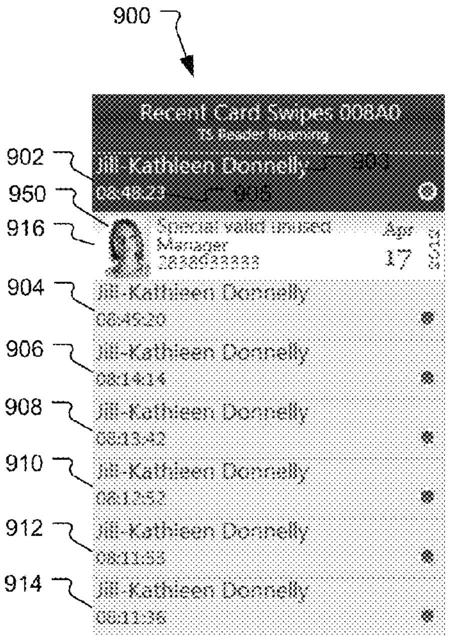
FIG. 9A shows the recent swipes screen of the recent swipes application, which is invoked by the recent swipes icon.

FIG. 9A shows the recent swipes screen 900 of the recent swipes application, which is invoked by the recent swipes icon 512 (shown in FIGS. 5A-5C and 6A-6B).

The recent card swipes screen 900 displays the most recent keycard swipes as a series of rows 902 to 914. Additionally, the name of the user (e.g., 903) and a time of the keycard swipe (e.g., 905) are also displayed in each row. In some embodiments, the rows 902 to 914 include an indication of whether the user was allowed or denied access or not.

In a typical implementation, selecting one of the rows causes an expanded row 916 to display to additional information such as the date of the keycard swipe, a telephone number of the user, a job title, and an image of the user, to list a few examples. In a typical implementation, an image of the user 950 can be enlarged by clicking on the expanded row 916.

Figure 9B:
FIG. 9B shows an example of an enlarged image, which is invoked by the user selecting one of the rows of the recent card swipes screen.

FIG. 9B shows an example of an enlarged version of the image 950, which is displayed after the user selects an expanded row (e.g., 916) from the recent card swipes screen 900 shown in FIG. 9A.

Figure 10:
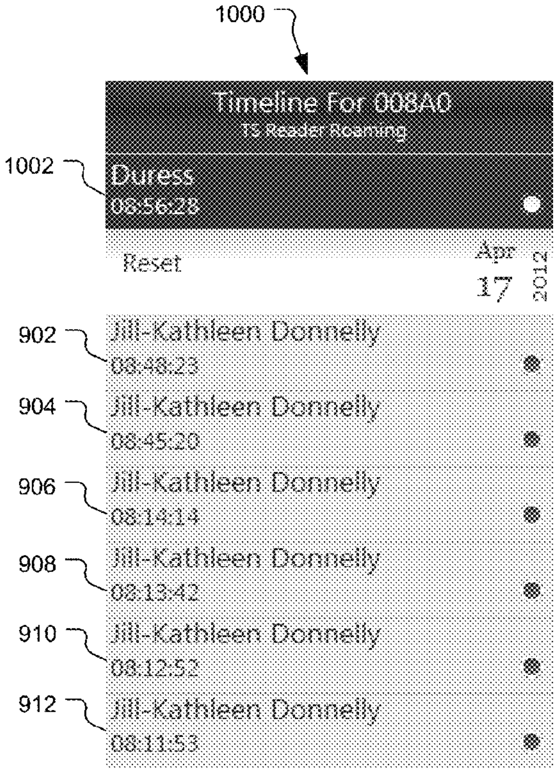
FIG. 10 shows the timeline screen of the timeline application, which is invoked by selecting the timeline alarms and swipes icon.

FIG. 10 shows the timeline screen 1000 of the timeline application, which is invoked by selecting the timeline alarms and swipes icon 516 (shown in FIGS. 5A-5C and 6A-6B).

The timeline screen 1000 displays a combination of the recent alarms and keycard swipes for the access control reader 102. The functionality of the timeline screen 1000 is identical to the recent alarms screen and/or recent swipes screens (shown in FIGS. 7 and 9A, respectively). Thus, each row is expandable to show additional information about the triggered alarm or keycard swipe.

Figure 11:
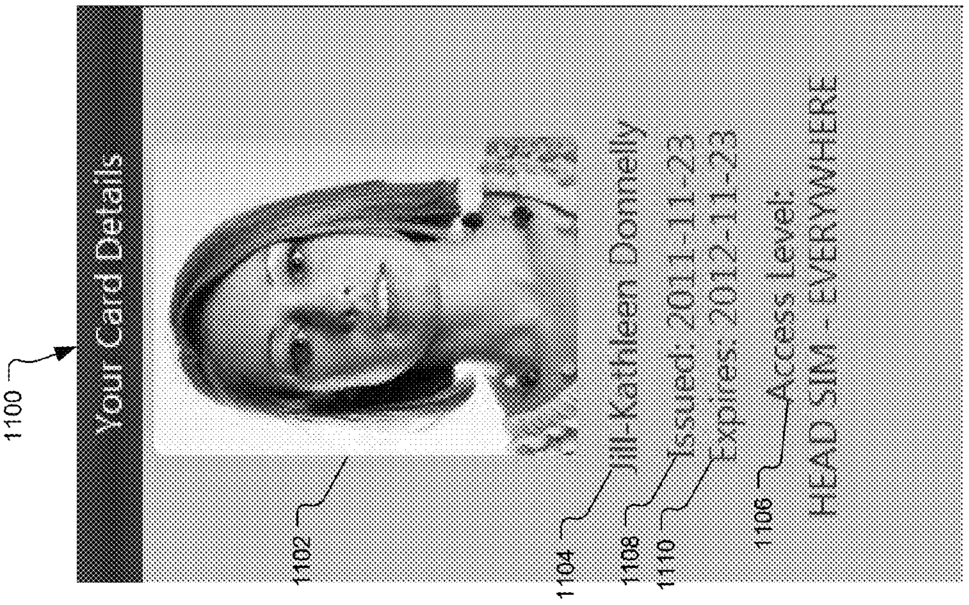
FIG. 11 shows the card details screen of the card details application, which is invoked by selecting the card details icon.
Figure 13A:
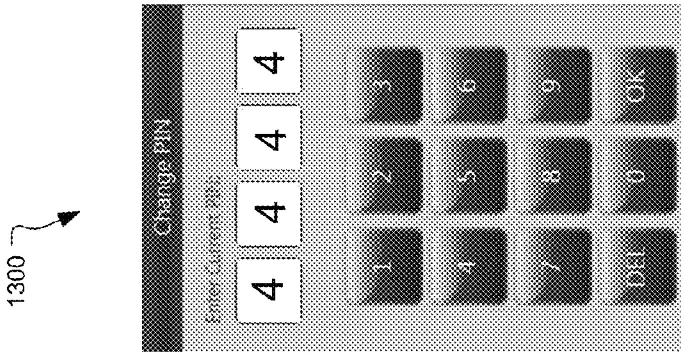
FIGS. 13A-13D show the sequence of screens for the PIN change application, which is invoked by the PIN icon.
Figure 13B:
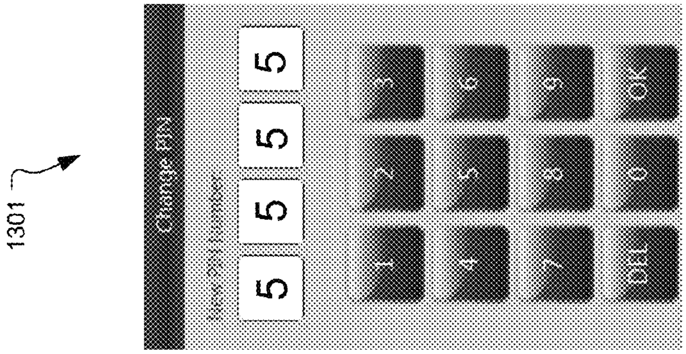
Figure 13C:
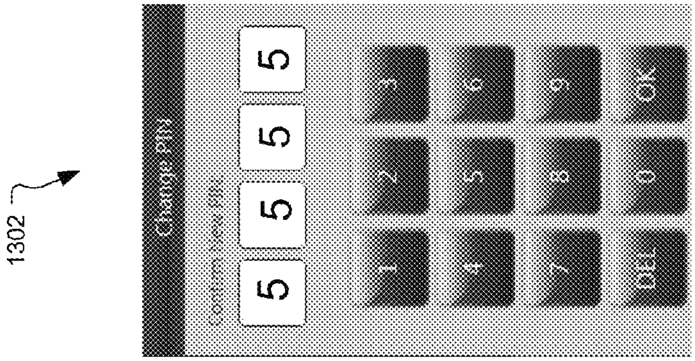
Figure 13D:
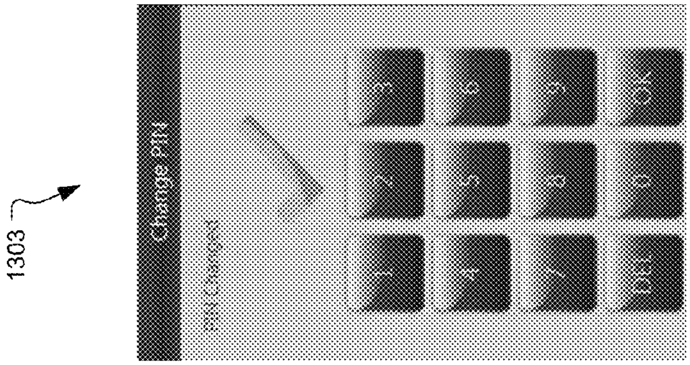

FIG. 11 shows the card details screen 1100 of the card details application, which is invoked by selecting the card details icon 502 (shown in FIGS. 5A-5C and 6A-6B).

The card details screen 1100 displays the user information associated with the swiped keycard. In the illustrated example the card details screen 1100 displays the user's name 1104, the access level of the user 1106, when the keycard was issued 1108, and when the keycard expires 1110. Additionally, an image of the user 1102 is also displayed (if available).

In alternative embodiments, additional information that could be displayed includes the user's department, company, and job title, to list a few examples.

Figure 12:
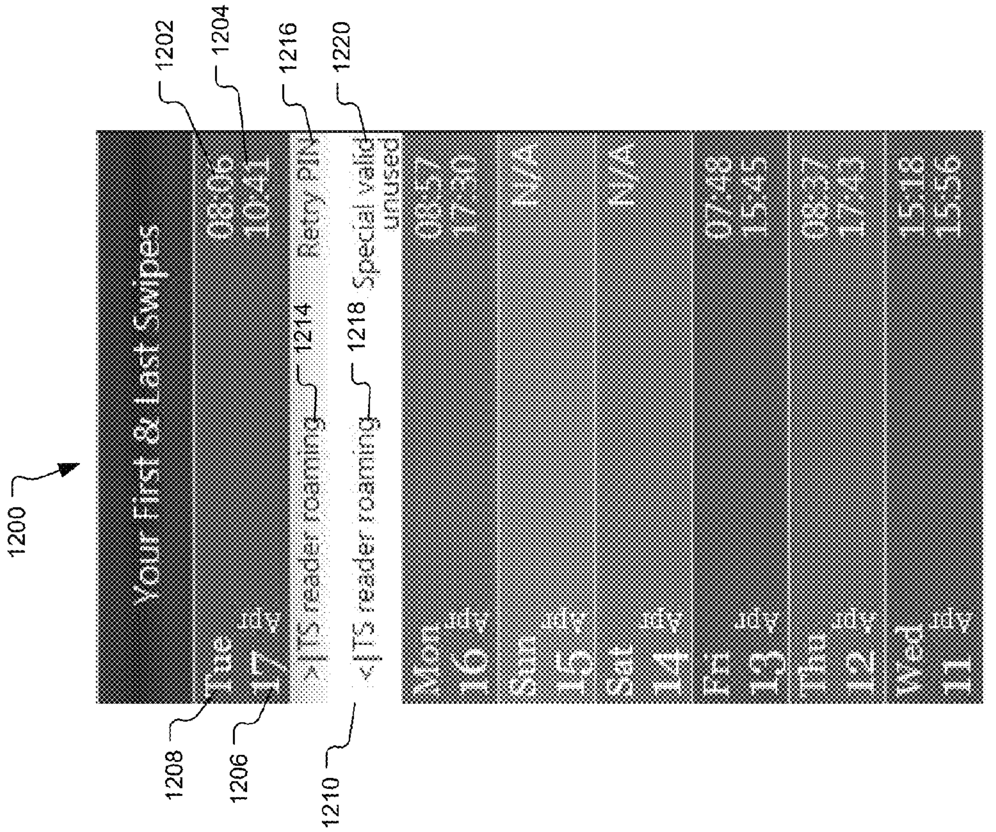
FIG. 12 shows the first and last swipes screen of the first and last swipes application, which is invoked by selecting the your first and last swipes icon.

FIG. 12 shows the first and last swipes screen 1200 of the first and last swipes application, which is invoked by selecting the first and last swipes icon 504 (shown in FIGS. 5A-5C and 6A-6B).

In the illustrated example, the first and last swipes screen 1200 displays the time of the first keycard swipe 1202, the time of the last keycard swipe 1204, the date 1206, and the day of the week 1208 for the keycard swipe.

Additionally, the rows are expandable to display an expanded row 1210 with additional information such as the location of where the first swipe occurred 1214, the action 1216 performed by the reader 102 in response to the keycard swipe, the last keycard swipe details 1218, and the action performed by the reader 102 in response to the last keycard swipe 1220, to list a few examples. If there are no logged keycard swipes, then the days are grayed out, unelectable, and "N/A" is displayed within the row.

FIGS. 13A-13D show the sequence of screens 1300-1303 for the PIN application, which is invoked by the PIN icon 508 (shown in FIGS. 5A-5C and 6A-6B).

In a typical implementation, the user 112 is able to change their PIN via the access control reader 102. At the enter current PIN screen 1300, the user enters their current PIN. If the user enters their current correct PIN (e.g., 4444), the new PIN screen 1301 is displayed to enable the user to enter a new PIN (e.g., 5555). Next, the confirm new PIN screen 1303 is displayed and the user is required to confirm their new PIN.

If the user enters matching PINs, then the PIN changed screen 1303 is displayed. In a current implementation, the PIN change application includes a timeout of approximately four second before returning the user to a previous screen. This timeout could be adjusted be longer or shorter.

Figure 14:
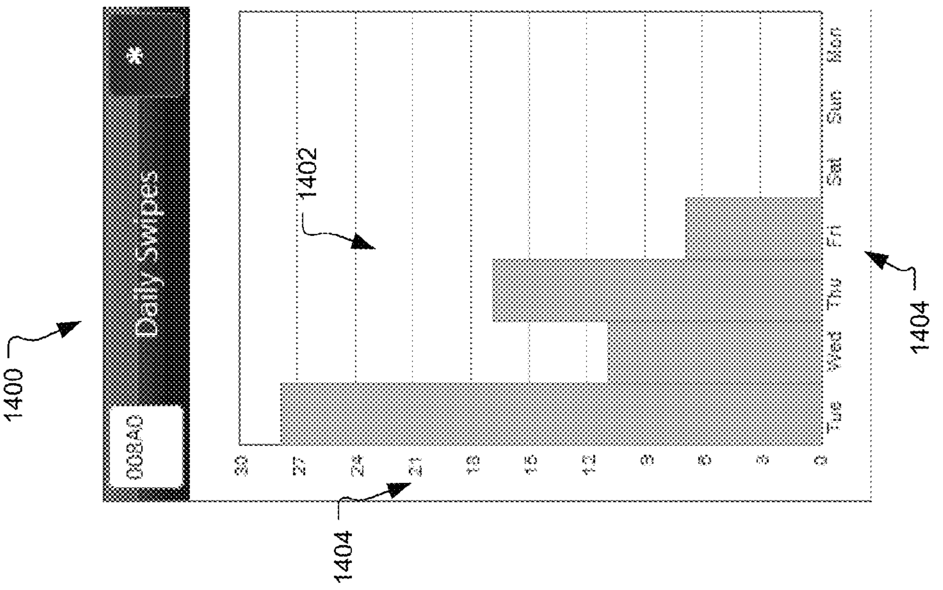
FIG. 14 shows the daily swipes screen of the daily swipes application, which is invoked by the daily swipes icon.

FIG. 14 shows the daily swipes screen 1400 of the daily swipes application, which is invoked by the daily swipes icon 520 (shown in FIGS. 5A-5C and 6A-6B).

The daily swipes screen 1400 displays a bar graph 1402 of the keycard swipes for the past week. Each day of the week is represented by a separate bar graph. The Y-axis 1404 displays the number of swipes and the X-axis 1406 displays the day of the week. In a typical implementation, the user is able to view the exact number of keycard swipes by selecting an individual bar. Generally, days without keycard swipes do not display bars. Additionally, if the user attempts to select a day without any keycard swipes, a zero is briefly displayed before returning the user to the daily swipes screen 1400.

Figure 15A:
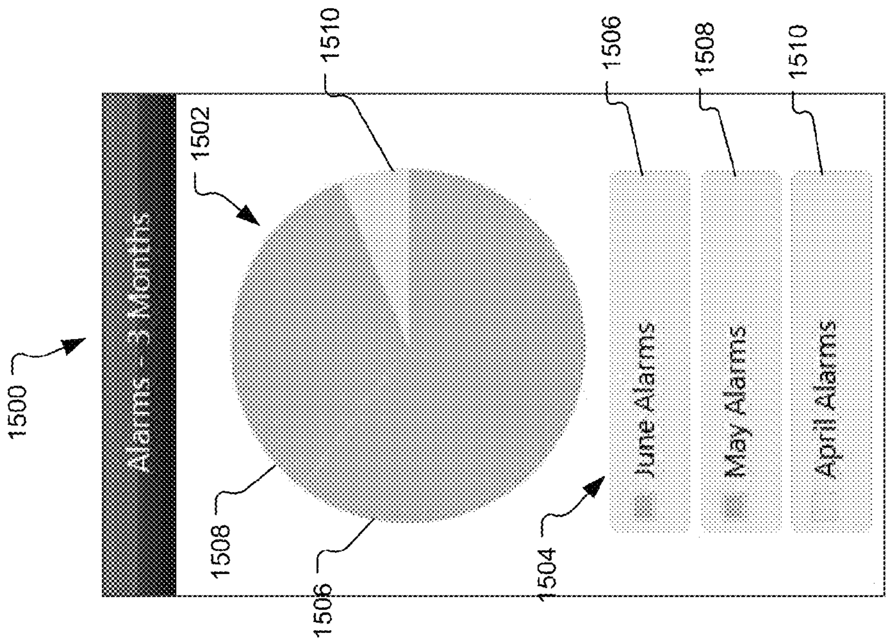
FIG. 15A shows the alarms—3 months screen of the alarms—3 months application, which is invoked by the alarms—3 months icon.

FIG. 15A shows the alarm—3 months screen 1500 of the alarms—3 months application, which is invoked by the alarms—3 months icon 522 (shown in FIGS. 5A-5C and 6A-6B).

The alarms—3 months screen 1500 displays a pie chart 1502 showing the distribution of alarms for the last three months of the entire security system 100. In alternative embodiments, the alarms could be displayed with a line graph, a bar graph, or as text, to list a few examples.

In a typical implementation, selecting one of the months 1506, 1508, 1510 of the legend 1504 displays additional information about the selected month.

Figure 15B:
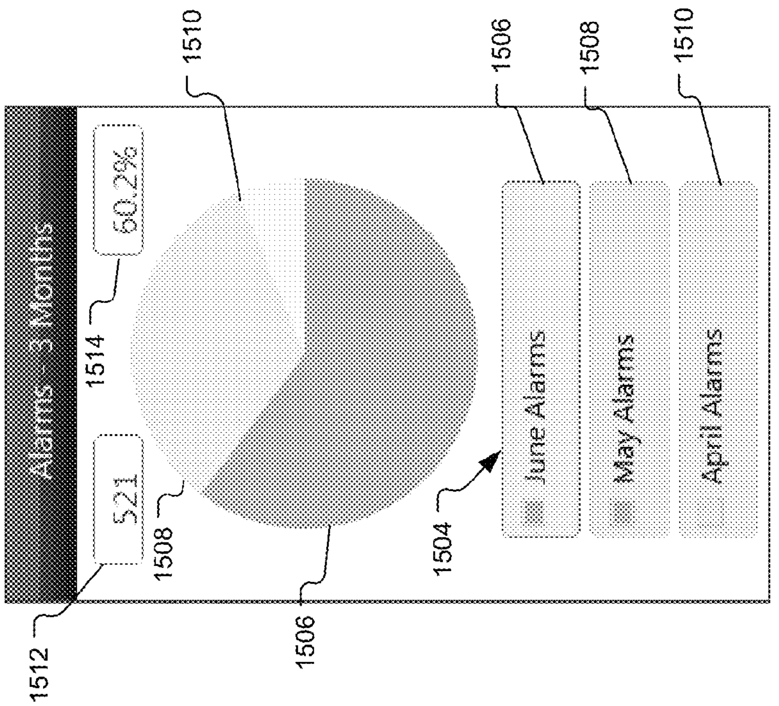
FIG. 15B shows an example of expanded information that is displayed after selecting one of the months from the alarms—3 months screen.

FIG. 15B shows an example of expanded information that is displayed after selecting one of the months from legend 1504.

In the illustrated example, the expanded information displays the total number of alarms 1512 and a percentage of total alarms 1514 for the month of June.

Figure 16A:
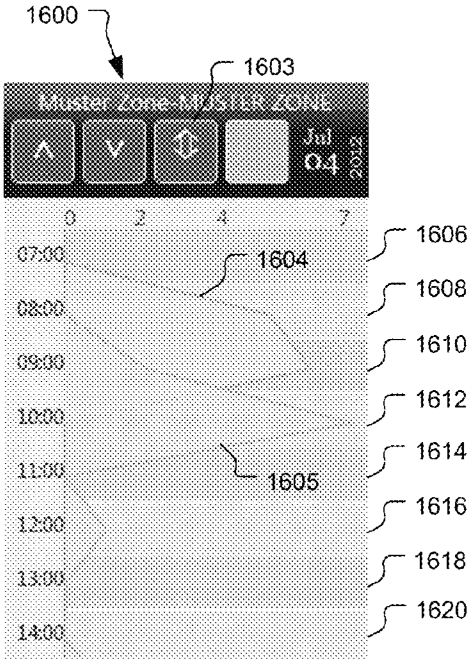
FIG. 16A shows the muster zone screen of the muster zone application, which is invoked by the muster zone icon.

FIG. 16A shows the muster zone screen 1600 of the muster zone application, which is invoked by the muster zone icon 524 (shown in FIGS. 5A-5C and 6A-6B).

The muster zone screen 1600 displays the number of people entering and leaving a zone as two line graphs. The number of people enter/leaving the zone is determined by the keycard swipes read by the access control reader 102 and any other readers controlling access to the zone. In the illustrated embodiment, the first line 1604 shows the people (or users) entering the muster zone and second line 1605 represents the people leaving the zone.

In a typical implementation, each day is divided down into hours, which are displayed on the Y-axis as a series of rows 1606 to 1620. The number of swipes for each hour is shown on the X-axis. Currently, the default view is 07:00 hours to 20:00 hours. The top of the muster zone screen 1600 displays the name of the muster zone, the location of the muster zone, and the selected day. A timeframe button 1603 expands the line graph to display the line graphs for the entire day. Additionally, the user is able to select if they wish to view only the number of people enter or leaving the muster zone.

Figure 16B:
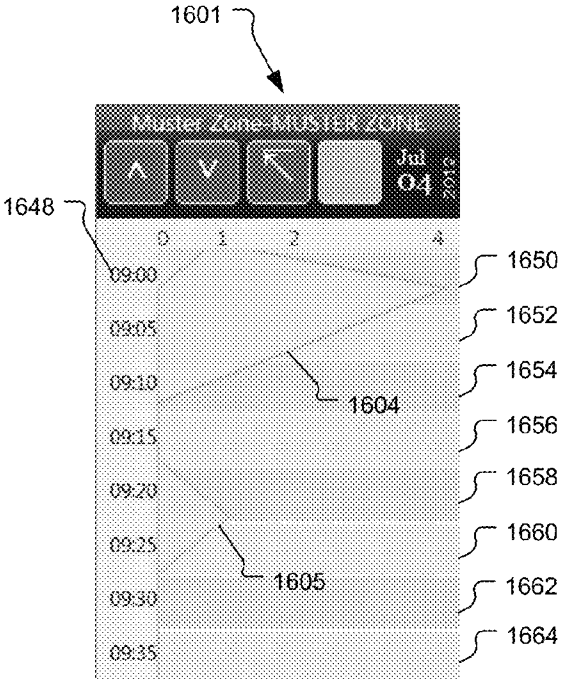
FIG. 16B shows expanded information that is selected from the muster zone screen.

FIG. 16B shows an expanded muster zone screen 1601. In a typical implementation, the user is able to view an hour that has been divided into 5 minute increments 1650 to 1664. Additionally, the user is able to view an exact total of all the people in the muster zone by selecting the time (e.g., 1648) on the Y-axis of the graph.

Figure 16C:
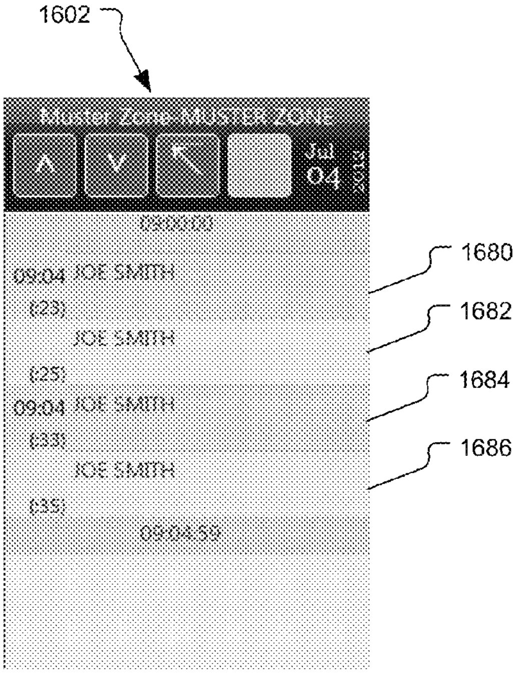
FIG. 16C shows additional expanded information that is selected from the expanded information displayed in FIG. 16B.

FIG. 16C shows a further expanded muster zone screen 1602. In a typical implementation, the user is able to view who has entered/left the muster zone and when.

Figure 17:
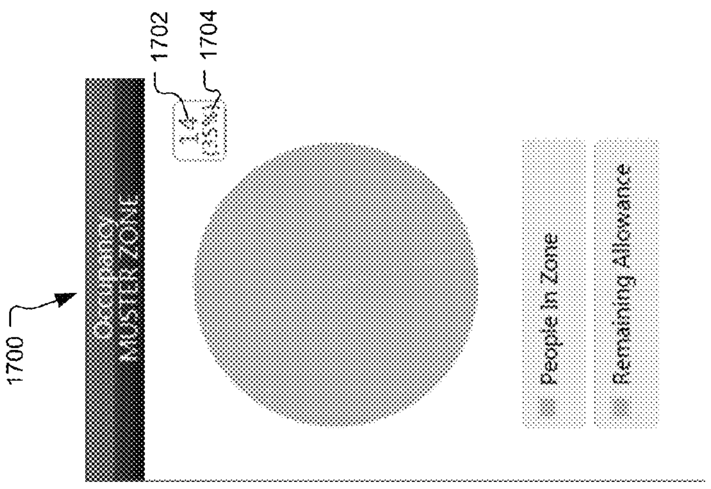
FIG. 17 shows the muster zone occupancy screen of the occupancy application, which is invoked by the occupancy icon.

FIG. 17 shows the muster occupancy screen 1700 of the occupancy application, which is invoked by the occupancy icon 526 (shown in FIGS. 5A-5C and 6A-6B).

The muster occupancy screen 1700 displays a pie chart of the number of people currently in a muster zone as well as the remaining allowance of people as a pie chart. Additionally, the exact number of people in the muster zone 1702 and percentage of maximum capacity 1704 are also displayed.

Figure 18:
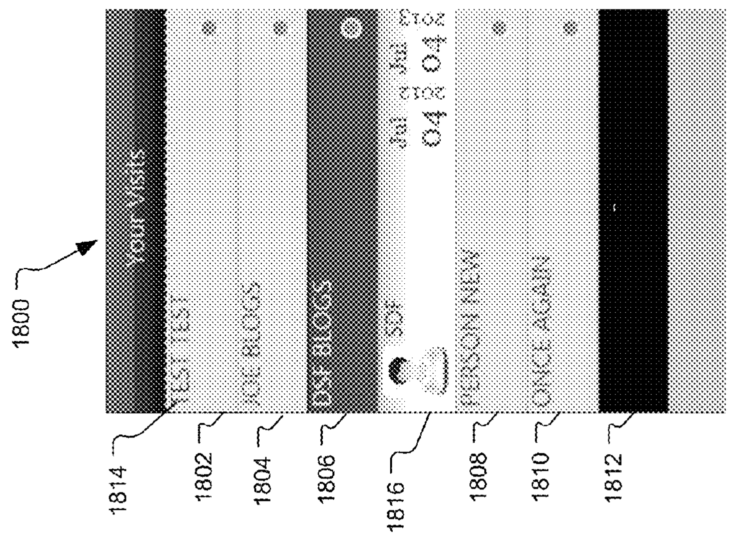
FIG. 18 shows the your visits screen of the your visits application, which is invoked by the your visits icon.

FIG. 18 shows the your visits screen 1800 of the your visits application, which is invoked by the your visits icon 528 (shown in FIGS. 5A-5C and 6A-6B).

The your visits screen 1800 displays upcoming and/or ongoing visits, which are client or visitors coming to meet the user at the office building. In a typical implementation, up to twenty visits are shown as a series of rows. Each row 1802 to 1810 represents one of the visits. If there are less than twenty visits, then a black row 1812 will be displayed so show that there are no more scheduled visits. In a current embodiment, the ongoing visits are displayed after the upcoming visits.

In one embodiment, the your visits screen 1800 displays the visitor's name 1814. In alternative embodiments, additional information such an arrival date, arrival time, and company name are also displayed. Additionally, in some embodiments, the user is able to expand each row (e.g., 1816), which displays the visitor's company, telephone number, and expected arrival date, to list a few examples.

Figure 19:
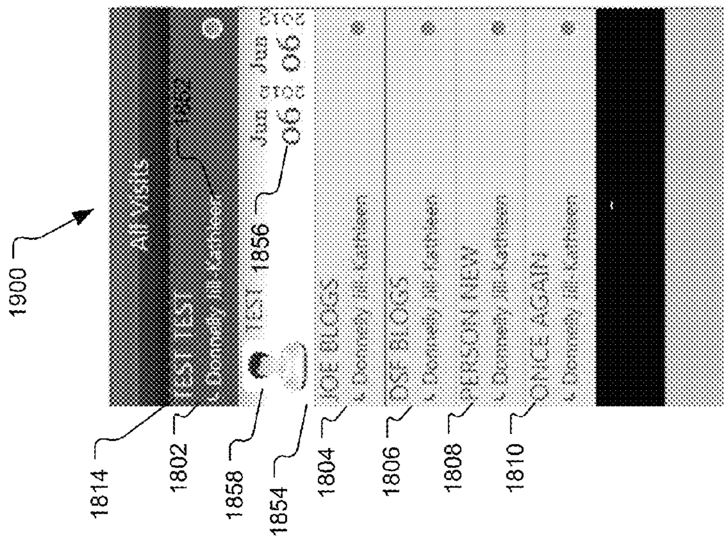
FIG. 19 shows the all visits screen of the all visits application, which is invoked by the all visits icon.

FIG. 19 shows the all visits screen 1900 of the all visits application, which is invoked by the all visits icon 530 (shown in FIGS. 5A-5C and 6A-6B).

The all visits screen 1900 displays upcoming visits for all of the users. Each visit is displayed as a separate row (e.g., 1802 to 1810). In typical implementation, each row displays the visitor's name (e.g., "Test Test") 1814 and the user 1852 being visited. In the illustrated example, all of the visitors are for a single user. However, if other users had visits scheduled, then their named and names of the visitors would be displayed as well. In a typical implementation, the rows are expandable to show additional information 1854 about the visitor such as an arrival date (or dates, if the visit is ongoing) 1856 and an image of the visitor 1858, to list a few examples.

Figure 20A:
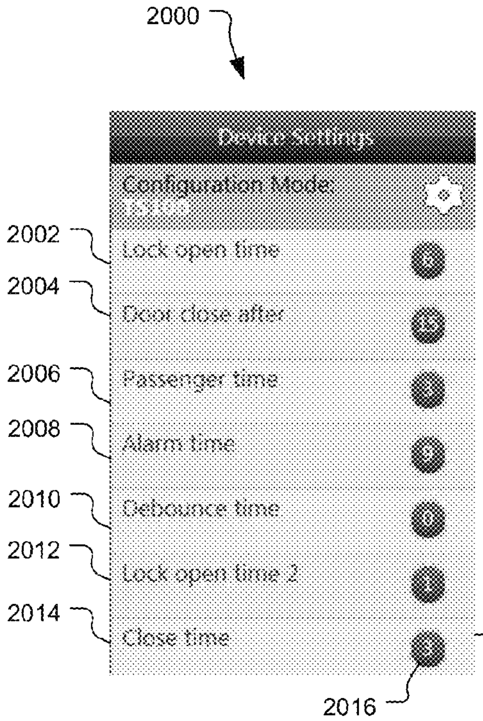
FIG. 20A shows the device settings screen of the device settings application, which is accessed by the device settings icon.

FIG. 20A shows the device settings screen 2000 of the device settings application, which is accessed via the device settings icon 532 shown in FIGS. 5A-5C and 6A-6B).

The device settings screen 2000 displays a list of user configurable settings. In the illustrated embodiment, the different settings appear as a series of rows: lock open time 2002, door close time 2004, passenger time 2006, alarm time 2008, debounce time 2010, lock open time 2012, and close time 2014. In one example, these settings would be applied to the access control reader 102 (see FIG. 1).

By way of example, the user is able to change the door close time, which is currently 3 seconds, by selecting the close time row 2014. After selecting the close time row, another row or window (see ref numeral 2001 in FIG. 20B) appears to enable the user to increase or decrease the door close time, which is displayed in a circle 2016 in the close time row 2014.

Figure 20B:
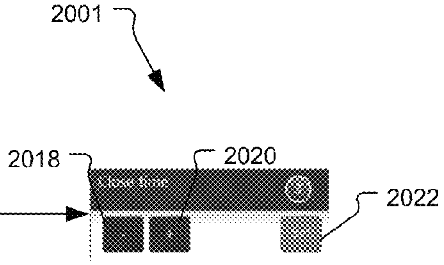
FIG. 20B shows an example of how the user is able to change the door close time.

FIG. 20B shows the user is able to change the door close time by selecting the '−'(minus) or '+' (plus) buttons 2018, 2020. To save the changes, the user selects the 'Set' button 2022. Similar interfaces are presented for the other user configurable settings in the other rows 2002 to 2012.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system operation method, comprising:

upon user activation of access control readers of the security system by users, validating the users by reference to user information stored by a realtime controller, the access control readers communicating with the realtime controller over a communications network;

determining whether an application mode of the access control readers is selected by the users;

displaying selectable applications on displays of the access control readers;

invoking the applications in response to selection by the users;

executing the applications on an application server; and sending output from the executing applications for display on the access control readers over the communications network for display on the access control readers.

2. The method as claimed in claim 1, wherein displaying selectable applications comprises:

determining assigned groups of the users; and acquiring a list of selectable applications from t application server based on the assigned groups of the users.

3. The method as claimed in claim 1, wherein sending the output from the executing applications comprises the application server sending PHP web pages that are displayed on the displays of the access control readers.

4. The method as claimed in claim 1, further comprising:

confirming that the users are authorized for access to doors associated with the access control readers; and unlocking the doors when the users are authorized for access and the application mode is not invoked by the users.

5. The method as claimed in claim 1, wherein the application mode is only enabled for validated users.

6. The method as claimed in claim 1, wherein the access control readers include intercom systems, which are comprised of speakers and microphones.

7. The method as claimed in claim 1, wherein the access control readers include card readers to read keycard information associated with keycards.

8. The method as claimed in claim 1, wherein invoking applications includes:

invoking daily swipes applications; and displaying on the displays of the access control readers numbers of swipes by the users over previous days.

9. The method as claimed in claim 1, wherein invoking applications includes;

invoking change PIN applications; and displaying on the displays of the access control readers current PIN screens, new PIN screens, and PIN confirmation screens.

10. The method as claimed in claim 1, wherein invoking applications includes:

invoking device configuration applications; and displaying on the displays of the access control readers device settings that users are able to configure.

11. The method as claimed in claim 1, wherein user selections made by interacting with the executing application at the access control readers are returned to the application server.

12. A security system comprising:

access control readers, each of the readers comprising: a display that displays a user interface that includes selectable applications that are invoked by the users;

a realtime controller that performs validation of users b comparing information read from keycards to user information stored at the realtime controller, the access control readers communicating with the realtime controller over a communications network; and an application server that supplies the user information to the access control readers and executes the applications and sends output from the executing applications for display on the access control readers over the communications network.

13. The system as claimed in claim 11, wherein the user validation system includes a card reader to read keycards of the users.

14. The system as claimed in claim 11, wherein the displays of the access control readers display web pages sent from the application server.

15. The system as claimed in claim 11, wherein the applications that are selected by the users are run on at least one backup server when a primary application server fails.

16. The system as claimed in claim 11, wherein the access control readers include intercom systems that are comprised of at least one speaker and at least one microphone.

17. The system as claimed in claim 11, wherein the applications include a daily swipes application that indicates on the displays of the access control reader numbers of swipes by the users over previous days.

18. The system as claimed in claim 11, wherein the applications include a pin change application that provides on the displays of the access control readers a new PIN screen and a PIN confirmation screen.

19. The system as claimed in claim 11, wherein the applications include a configuration application that displays device settings for the access control readers that users are able to configure.

20. The system as claimed in claim 11, wherein user selections made by interacting with the executing application at the access control readers are returned to the application server.

21. A security system operation method, comprising:

upon user activation of access control readers of the security system by users, validating the users by reference to user information provided by an application server and determining whether an application mode of the access control readers is selected by the users;

displaying selectable applications on displays of the access control readers; and invoking the applications in response to selection by the users, including:

invoking daily swipes applications, displaying on the displays of the access control readers numbers of swipes by the users over previous days, invoking change PIN applications, and displaying on the displays of the access control readers current PIN screens, new PIN screens, and PIN confirmation screens;

enabling intercom functions at the access control readers using speakers and microphones, wherein the applications execute on the application server and send output from the executing applications for display on the access control readers over a communications network.

* * * * *